May 20, 1952     L. M. HOLLINGSWORTH     2,597,327
MEASURING DEVICE
Filed April 2, 1946
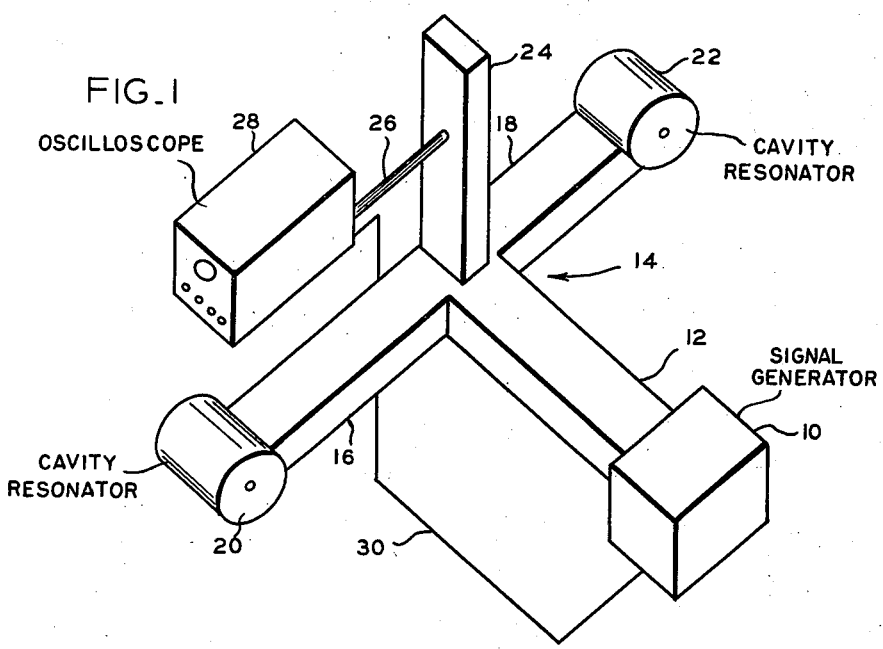
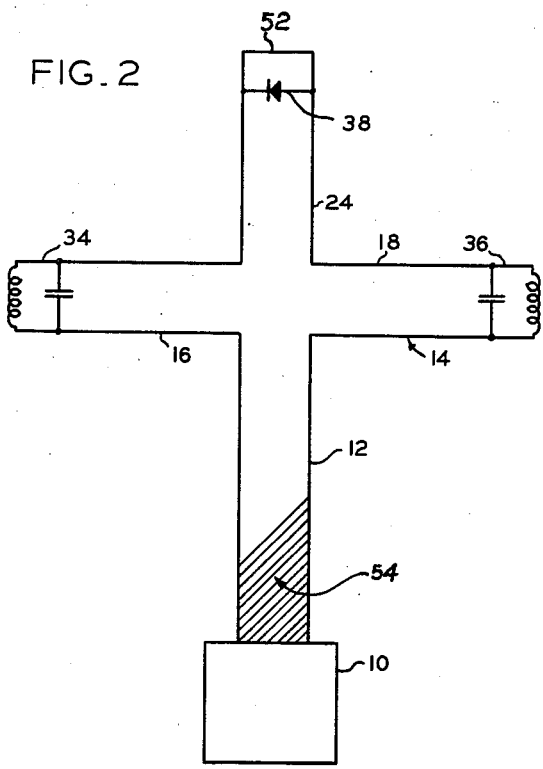
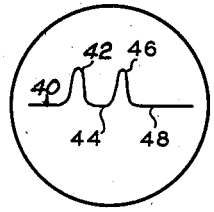
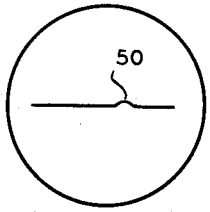
INVENTOR
LOWELL M. HOLLINGSWORTH
BY
*William D. Hall,*
ATTORNEY Patented May 20, 1952

2,597,327

UNITED STATES PATENT OFFICE 2,597,327

MEASURING DEVICE

Lowell M. Hollingsworth, Cambridge, Mass., assignor, by mesne assignments, to United States of America as represented by the Secretary of War Application April 2, 1946, Serial No. 659,048

1 Claim. (Cl. 175—183)

This application relates to measuring devices and more particularly for measuring devices for comparing the resonant frequencies of microwave cavity resonators.

In many applications in the electronic art, it is necessary to compare the resonant frequency of two or more microwave cavity resonators. This may be for the purpose of measuring the resonant frequency of one or more of the cavity resonators or it may be that one or more of the cavity resonators is to be adjusted so that its resonant frequency is equal to the resonant frequency of a second or standard cavity resonator. Many more useful applications of such a measuring device will be immediately obvious to those skilled in the art.

It is an object of this invention therefore to provide a simple novel measuring device for comparing the resonant frequency of two cavity resonators.

It is a further object of this invention to provide a novel device for indicating visually when two cavity resonators are tuned to exactly the same frequency.

For a better understanding of the invention together with other and further objects thereof, reference is had to the following description taken in connection with the accompanying drawing in which:

Fig. 1 is a schematic drawing of the preferred embodiment of the present invention;

Fig. 2 is an equivalent circuit of the device shown in Fig. 1; and

Figs. 3 and 4 are views of the screen of the indicator that forms a part of the measuring device of Fig. 1.

In Fig. 1 a signal generator 10 is connected to one arm 12 of a wave guide magic-T or T-bridge 14. Arms 16 and 18 of T-bridge 14 are terminated in cavity resonators 20 and 22 respectively.

As shown in Fig. 1 resonators 20 and 22 are the only impedances terminating arms 16 and 18. Resonators 20 and 22 may however be connected in series or parallel with any other fixed impedance; for example, a short circuit terminating arms 16 and 18. One or both of resonators 20 and 22 may be made easily removable for the purpose of attaching other resonators (not shown), that is, resonator 22 may be permanently fastened to arm 18 and various other resonators attached in turn to arm 16 so that they may be adjusted to correspond in tuning to resonator 22. In other embodiments both resonators 22 may be made removable so that other resonators may be attached to arms 16 and 18 and adjusted in pairs.

The fourth arm 24 of T-bridge 14 is terminated in a crystal detector (not shown) and a short circuit each properly positioned in respect to the other. In this embodiment of the invention the output of the crystal detector is applied by way of connection 26 to the vertically deflecting plates of a cathode ray oscilloscope 28. An electrical connection 30 is made from the oscilloscope 28 to generator 10 for reasons that will be made clear presently.

In Fig. 2 there is shown schematically frequency generator 10 and arms 12, 16, 18 and 24 of T-bridge 14 all numbered to correspond to similar elements in Fig. 1. Parallel inductance-capacitance circuits 34 and 36 represent schematically cavities 20 and 22, respectively, of Fig. 1. Crystal detector 38 and short circuit termination 52 represent elements described in connection with Fig. 1 but now shown in this figure. Diagonal lines 54 in arm 12 represent schematically a resistance strip that may be placed in this arm to absorb energy reflected from the junction of arm 12 with the other three arms of the T-bridge.

The construction and operation of the T-bridge 14 shown in Figs. 1 and 2 is illustrated and explained in the copending applications of Robert L. Kyle, Serial No. 580,014, filed February 27, 1945 which has since become abandoned, and of Robert H. Dicke, Serial No. 581,695, filed March 8, 1945, now Patent No. 2,593,120, issued April 15, 1952; and Serial No. 586,413, filed April 3, 1945. While reference to the above-mentioned copending applications will aid in understanding the operation of this invention, those skilled in the art will find that the following description, including briefly the operation of this type of bridge as applied to this invention, contains sufficient details to make this reference unnecessary. The characteristics of the T-bridge employed in this invention include:

(1) If a signal is applied to arm 12 of T-bridge 14 and the impedances presented at their junction by arms 16 and 18 are equal, no signal will pass to arm 24 of the T-bridge; and (2) If the impedances presented by these two arms 16 and 18 are not equal, a signal will pass from arm 12 to arm 24.

It is understood that arms 12, 16, 18 and 24 of T-bridge 14 are sections of wave guide of the proper size to transmit the signal from generator 10. If identical cavity resonators are to be compared, arms 16 and 18 should be electrically equal in length. If, however, the resonators to be compared are not electrically identical, the length of arms 16 and 18 should be such that resonant impedances of the two resonators are equal as seen from the junction of arms 16 and 18. Energy from generator 10 is transmitted down arm 12 and will divide and pass down arms 16 and 18 but no energy will pass into arm 24 directly. The energy passing down arms 16 and 18 will be reflected by resonators 20 and 22 respectively back along arms 16 and 18. The reflection of the energy occurs because resonators 20 and 22 do not terminate arms 16 and 18 in their characteristic impedances. If the reflections of the energy in the two arms of the T-bridge are equal, both in magnitude and phase angle, the energy from arms 16 and 18 will pass back into arm 12 where it is absorbed by resistance strip 54 shown in Fig. 2. If the reflections of the energy in both arms are not equal either in amplitude or in phase angle or in both some energy will pass into arm 24 where it will be rectified by crystal 38 and applied as a D.-C. potential to the vertically deflecting plates of oscilloscope 28. As will be shown later, it is often desirable to have other than a single frequency generated by circuit 10 but a single frequency may be employed if that frequency is near the resonant frequency of one of the cavity resonators for example resonator 22. In order to operate satisfactorily the frequency difference between resonator 22 and the frequency of generator 10 should be of the order of ½Q where Q is the loaded quality factor of cavity 22. Assuming for the moment that a single frequency is produced by generator 10 and the resonant frequency of cavity resonator 20 is not equal to the resonant frequency of cavity resonator 22, the spot on the screen of cathode ray oscilloscope 28 will be deflected from its normal position due to the signal supplied by detector 38. Assume further that the frequency of generator 10 bears the relationship to the resonant frequency of resonator 22 described above. If the resonant frequency of resonator 20 is now varied by any convenient electrical or mechanical means the angle and magnitude of the reflection of the energy in arm 16 will change. When the frequency to which resonator 20 is tuned is equal to the resonant frequency of cavity 22 the reflection of energies in arms 16 and 18 will be equal and no energy will pass through arm 24 and, therefore, the spot of oscilloscope will be in its normal undeflected position. The change in position of the spot on the oscilloscope 28 occurs very rapidly for the reason that the change in magnitude and phase angle of a cavity resonator is very great in a small region either side of the resonant frequency. If desired a direct current meter may be substituted for oscilloscope 28 and the dip in the meter reading will indicate when the two cavities are tuned to the same frequency.

In the embodiment shown in Fig. 1, generator 10 may be frequency modulated by a sawtooth voltage applied by way of connection 30 from cathode ray oscilloscope 28. The same sawtooth voltage may be employed as a horizontal sweep in oscilloscope 28. As the frequency of generator 10 passes through the resonant frequency of cavities 20 and 22 resonance type curves will be traced on the screen of oscilloscope 28. Figs. 3 and 4 show two of these curves. In the description of Fig. 3 it will be assumed that resonator 20 is tuned to a lower frequency than is resonator 22. When the frequency from generator 10 greatly exceeds the frequency deviation or ½Q as defined above, the impedances of the two cavities will be substantially equal; therefore, the spot on oscilloscope 28 will be in its undeflected position as shown by segment 40 in Fig. 3. As the frequency from generator 10 passes through the resonant frequency of cavity 20 the impedance of cavity 20 to the energy in arms 16 will change rapidly both in phase angle and magnitude so that the impedances presented by arms 16 and 18 at the junction are no longer equal. Energy will therefore pass into arm 24 where it will be rectified by detector 38 and cause a vertical deflection of the cathode ray beam. This deflection is shown by segment 42 in Fig. 3. Once the frequency of generator 10 passes the resonant frequency of cavity 20 the spot will return to its normal undeflected position as illustrated by segment 44 and will remain in this substantially undeflected position until the frequency of generator 10 approaches the resonant frequency of cavity 22. As the frequency of generator 10 passes through the resonant frequency of cavity resonator 22 the beam will again be deflected as shown by segment 46. As soon as the frequency from generator 10 passes through the resonant frequency of cavity resonator 22 the cathode ray beam will again return to its normal undeflected position as indicated by segment 48. Since the same sawtooth is employed to frequency modulate generator 10 and to provide a base line on oscilloscope 28, segments 42 and 46 will remain substantially fixed in position on the screen so long as the resonant frequency of cavity resonators 20 and 22 are not changed. The position of segments 42 and 46 along the base line indicates the frequency to which resonators 20 and 22 are tuned. In some embodiments of the invention it may be convenient to provide a scale superimposed on the screen of oscilloscope 28 to indicate the frequency at which segments 42 and 46 occur.

In the description of Fig. 4 it will be assumed that resonators 20 and 22 are both tuned to the same frequency. The frequency of generator 10 is swept as before. It can be seen from Fig. 4 that no resonant type curves such as segments 42 and 46 of Fig. 3 occur in the base line of Fig. 4. The reason for this is that although the impedances of both resonators 20 and 22 change rapidly as the frequency from generator 10 sweeps through the frequency to which these resonators are tuned the change in impedance both in magnitude and in phase occurs simultaneously in both resonators so that the impedances presented by arms 16 and 18 at their junction are always equal and therefore no energy will pass in to arm 24. A slight ripple such as is illustrated by segment 50 in Fig. 4 may occur at the resonant frequency of the two cavity resonators due to the fact that some slight difference in impedance may be presented by one of the resonators 20 or 22. This ripple 50 will be very much smaller in amplitude than either segment 42 or 46. Segment 50 is not entirely undesirable because this small break in the base line may be employed to determine the frequency to which the resonators are tuned. If no such ripple occurs a slight detuning of one of the resonators will bring such a ripple or break in the base line into view.

The procedure by which two resonators are tuned to the same frequency should now be apparent. With the apparatus set up as shown in Fig. 1, the frequency of one or both of the resonators is adjusted so that segments 42 and 46 of Fig. 3 move toward each other. At the point they coincide the segments will not reinforce each other as might be first supposed, but rather they will cancel to produce the indication shown in Fig. 4. This permits very accurate adjustment of the frequency of the resonators. If it is desired to tune both resonators to the same frequency, the frequency having been previously selected, one resonator may be tuned until the segment indicating its resonant frequency indicates that this resonator has been tuned to the desired frequency. The second resonator may then be tuned to the frequency of the first resonator in the manner just described.

From the foregoing discussion it should be apparent that this device has many useful applications in the electronic art. It may be employed to adjust the frequency of two cavity resonators to exactly the same frequency. It is possible by proper calibration of frequency generator 10 to tune one or both resonators to a selected frequency or frequencies, and if one of the resonators is calibrated it is possible to measure the frequency or frequency sweep of generator 10.

While there has been described what is at present considered to be the preferred embodiment of this invention, it will be obvious to those skilled in the art that various changes and modifications may be made therein without departing from the spirit and scope of this invention.

The invention claimed is:

A device for tuning a pair of ultra-high frequency resonators to a predetermined frequency comprising four waveguide arms of substantially the same impedance coupled together at a common junction point, a pair of said arms being aligned, the remaining pair of said arms being perpendicular to one another and to said aligned arms and being coupled respectively in series and in parallel with said aligned pair, adjustable means for introducing a frequency-variable signal into one arm of one of said remaining pairs of arms, said signal varying linearly through a predetermined frequency range, a cathode ray oscilloscope having a pair of sweep circuits for producing beam deflections along two coordinates perpendicular to one another, means coupling said signal introducing means to one of said sweep circuits for synchronizing the indications given by said oscilloscope with the frequency of said signal, said oscilloscope being calibrated to give an indication of the frequency of said signal, a detector coupled between the other arm of said remaining pair of arms and the other of said sweep circuits, a pair of ultra-high frequency resonators respectively terminating the arms of the aligned pair of arms and adapted to be tuned in a manner to present substantially the same impedances at said common junction point, and a resistance strip connected in said one arm of said remaining pair of arms to absorb energy reflected from said common junction point.

LOWELL M. HOLLINGSWORTH.

REFERENCES CITED

The following references are of record in the file of this patent:

UNITED STATES PATENTS

| Number | Name | Date |
| --- | --- | --- |
| 2,243,234 | Von Duhn | May 27, 1941 |
| 2,380,791 | Rosencrans | July 31, 1945 |
| 2,416,790 | Barrow | Mar. 4, 1947 |
| 2,498,548 | Howard | Feb. 21, 1950 |